(12) United States Patent
Mehl et al.

(10) Patent No.: US 8,333,420 B2
(45) Date of Patent: Dec. 18, 2012

(54) SLING SEAT

(75) Inventors: Robert Alan Mehl, Boca Raton, FL (US); Andrew Walker, Deerfield Beach, FL (US); Norman Raul Shimizu, Pembroke Pines, FL (US); Jorge Cuervo, Hollywood, FL (US); Michael Duncan, Pompano Beach, FL (US); Marianne Kump, Pompano Beach, FL (US)

(73) Assignee: BAE Systems Safety Products Inc., Pompano Beach, FL (US)

( * ) Notice: Subject to any disclaimer, the term of this patent is extended or adjusted under 35 U.S.C. 154(b) by 118 days.

(21) Appl. No.: 13/077,114

(22) Filed: Mar. 31, 2011

(65) Prior Publication Data

US 2011/0241373 A1 Oct. 6, 2011

Related U.S. Application Data

(60) Provisional application No. 61/320,009, filed on Apr. 1, 2010.

(51) Int. Cl.
*B60N 2/00* (2006.01)

(52) U.S. Cl. ..................... 296/63; 297/344.12

(58) Field of Classification Search ............. 296/63, 296/65.01; 297/344.1, 344.12
See application file for complete search history.

(56) References Cited

U.S. PATENT DOCUMENTS

| 2,556,076 | A | * | 6/1951 | Evans et al. ............. 5/9.1 |
| 3,868,143 | A | | 2/1975 | Reilly |
| 4,602,816 | A | * | 7/1986 | Chandler ............. 296/63 |
| 5,806,910 | A | * | 9/1998 | DeRees ............. 296/63 |
| 7,175,233 | B2 | | 2/2007 | Greenwood et al. |
| 8,214,945 | B2 | * | 7/2012 | Walker ............. 5/83.1 |
| 2007/0243939 | A1 | * | 10/2007 | Mead ............. 472/118 |
| 2008/0028516 | A1 | * | 2/2008 | Morishima ............. 5/89.1 |
| 2010/0084897 | A1 | | 4/2010 | Greenwood |
| 2010/0084907 | A1 | | 4/2010 | Greenwood et al. |

FOREIGN PATENT DOCUMENTS

| DE | 4303719 | 8/1994 |
| DE | 10334685 | 10/2004 |
| EP | 1398205 | 3/2004 |
| EP | 1593542 | 11/2005 |
| EP | 2127940 | 12/2009 |
| EP | 2208635 | 7/2010 |
| WO | WO2005/080126 | 9/2005 |
| WO | WO2009/121537 | 10/2009 |

OTHER PUBLICATIONS

European Patent Application No. 11160632.3, European Search Report dated May 20, 2011.
Information on Prior Art Sling Seats.

* cited by examiner

*Primary Examiner* — Lori Lyjak
(74) *Attorney, Agent, or Firm* — Kane Kessler, P.C.; Paul E. Szabo

(57) ABSTRACT

A sling seat includes a seat back and a seat bottom cushion connected by resilient arms. Flexible supports and emergency release connectors suspend the seat from an overhead structure. The height of the seat, and the position of the seat back relative to the seat bottom cushion, are adjustable. The seat may be used in a military vehicle, for example as a gunner sling seat.

16 Claims, 5 Drawing Sheets

SLING SEAT

RELATED APPLICATION

This application claims the benefit of U.S. Provisional Application No. 61/320,009 filed Apr. 1, 2010, the entire disclosure of which is hereby incorporated by reference.

BACKGROUND OF THE INVENTION

The present invention relates to a seat for a vehicle. In particular, the invention relates to a "sling seat", that is, a seat that is suspended from overhead structure in a vehicle instead of being supported by the vehicle floor, and that thus can swing within the vehicle (or stay in place while the vehicle moves about it). As one example, the invention relates to a "sling seat" for a gunner in a military vehicle. The seats that are in use today for this application are uncomfortable for long periods of use, are not easily adjustable for different size occupants and for occupants with and without personal gear, and do not provide good support and balance. These current seats are potentially dangerous as during certain vehicle maneuvers the user can tip rearwards or fall off the seat causing injury to the user. Also, the seats do not easily release with a single user movement during emergency evacuation situations.

DETAILED DESCRIPTION

Figure 1:
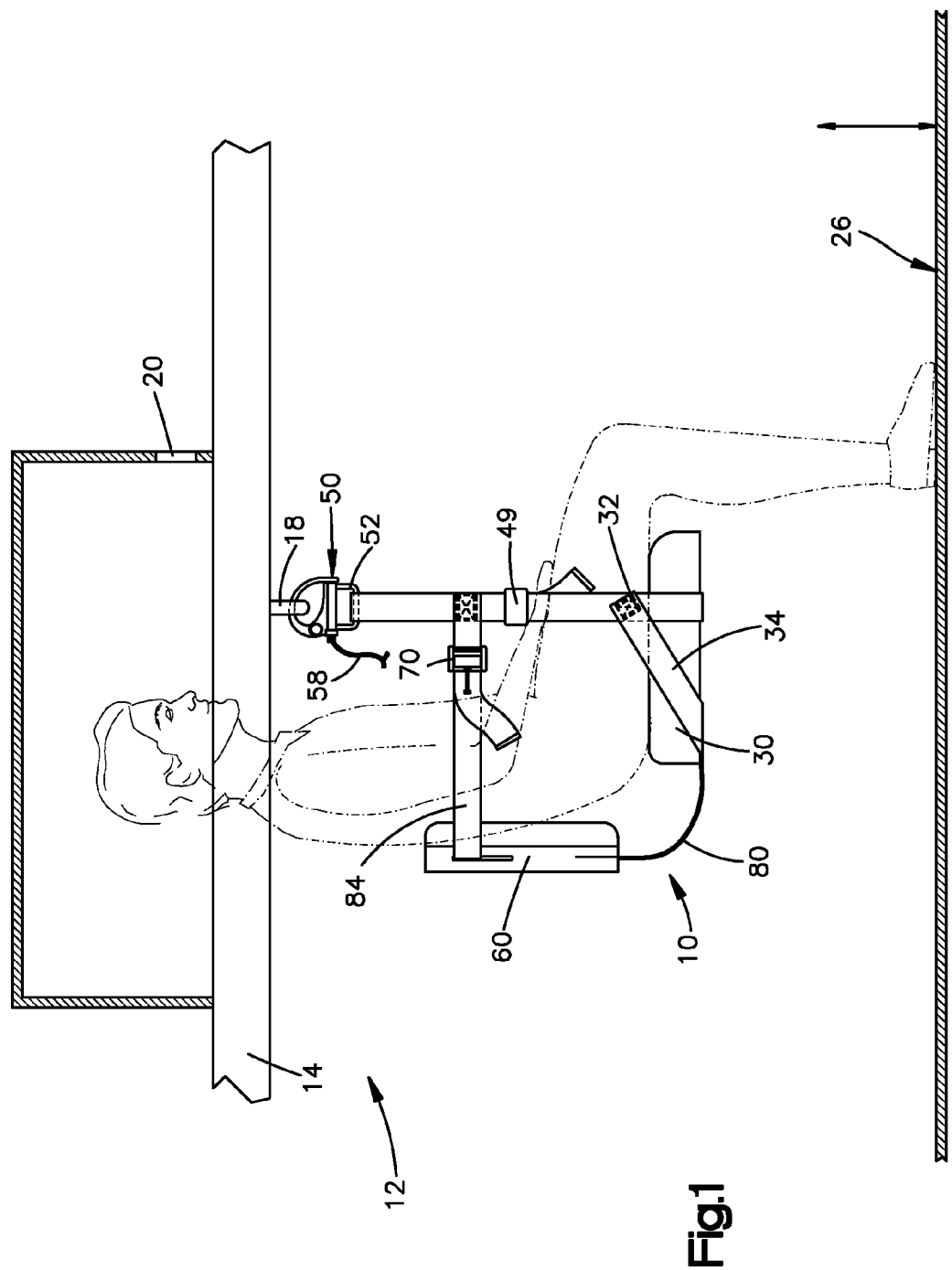
FIG. 1 is a schematic side illustration of a seat that is a first embodiment of the invention, shown supported from an overhead structure of a vehicle.

As representative of the invention, FIG. 1 illustrates a seat 10 that is a first embodiment of the invention. The seat 10 is illustrated as being in use in a vehicle 12. The vehicle 12 may be, but need not be, a military vehicle of the type including an overhead gun (not shown) to be fired by an occupant of the seat. In addition, a seat of the present invention need not be used only in a vehicle, but could alternatively be used in other applications.

The specific vehicle 12 that is illustrated includes an overhead structure shown schematically at 14 that includes two support brackets 18 (FIG. 2) for supporting the seat 10, in a manner described below. The vehicle 12 has a turret opening 20 (FIG. 1) or other type of port, through which the seat occupant can if desired see out of the vehicle, for example, to aim the vehicle's gun. The overhead structure 14 is rotatable 360 degrees, rotating the seat 10 with it. Underneath the seat 10 is a vehicle floor portion 26 (FIG. 1) that may be selectively movable vertically relative to the overhead structure 14, thereby to support the occupant's feet at one or more different vertical positions relative to the overhead structure 14 and the turret opening 20.

Figure 4:
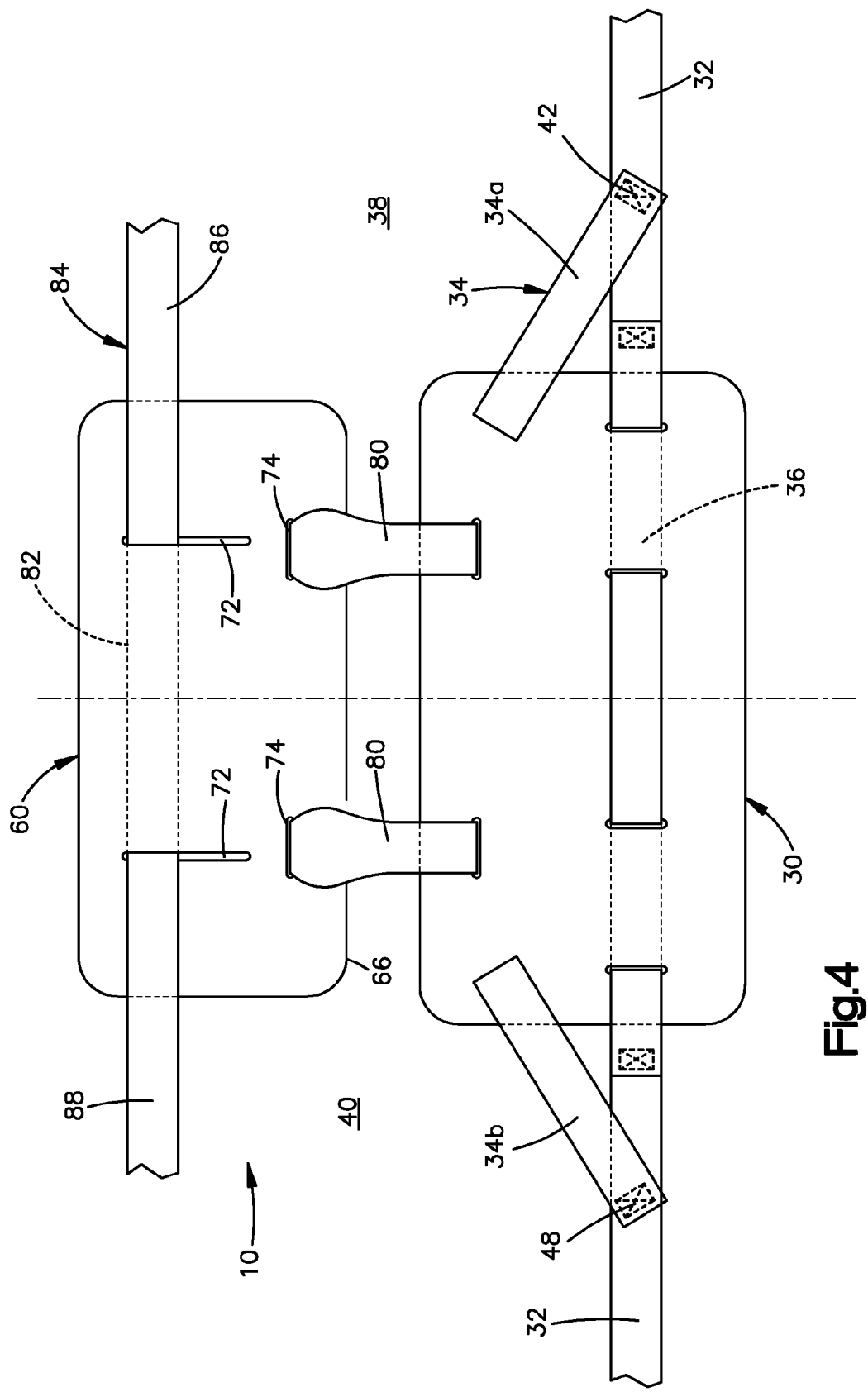
FIG. 4 is a schematic back view of the seat back and seat bottom cushion.
Figure 5:
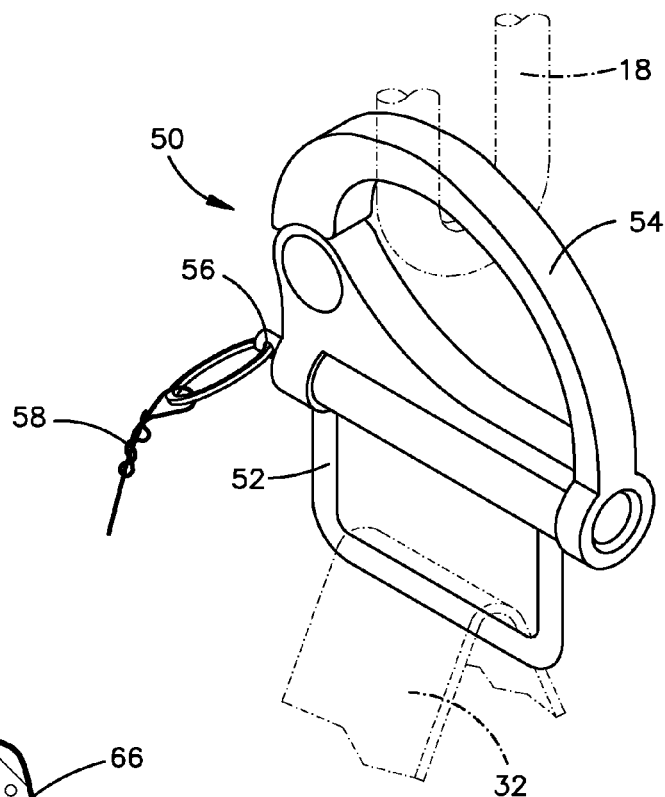
FIG. 5 is an enlarged view of a snap shackle that is part of the seat of FIG. 1.

The seat 10 (FIGS. 2 and 4) includes as its major components a seat bottom cushion 30, supported from the vehicle overhead structure, and a seat back 60 that is loosely connected with the seat bottom cushion. The seat bottom cushion 30 may be made from one or more different foams, supported on a stiff base. The different foams may include a very soft foam around the outer edge of the seat cushion 30 to increase user comfort. A variety of foam stiffnesses may be provided throughout the seat bottom cushion 30, as needed. In another embodiment, the seat bottom cushion 30 (and the seat back 60) may not be padded or cushioned at all, but rather may be hard parts; the invention is not limited to "cushioned" seats.

The seat bottom cushion 30 is wide enough, and both contoured and cushioned, to provide long term comfort to an occupant of the seat 10, for example, without causing leg numbness. The contoured foam positions the occupant rearward and centered on the seat bottom cushion 30. This moves the occupant's center of gravity rearward of the seat's supporting straps, to reduce the sensation of being pitched forward and to give an improved sense of balance.

The seat bottom cushion 30 is supported by a primary support in the form of a strap 32 (FIGS. 2 and 4) that is connected as described below with the overhead structure 14 of the vehicle 12. The primary strap 32 extends completely across the seat bottom cushion 30, through a strap passage 36 (FIG. 4) that extends across the width of the seat bottom cushion, from the occupant's left side 38 of the seat 10 to the occupant's right side 40 of the seat.

A secondary strap 34 on the seat bottom cushion 30 preferably includes two end portions 34a and 34b that project from the two sides of the seat bottom cushion 30, at an angle, to stabilize the seat bottom cushion and increase load bearing capacity. The end portions 34a and 34b are sewn to the primary strap 32 at a location close to the seat bottom cushion 30, as shown.

The straps 32 and 34, like all the other straps in the seat 10, are made from a flexible material, such as seat belt webbing or something similar. In one embodiment the seat bottom cushion 30 is fixed in position on the straps 32 and 34, that is, not slidable laterally. In other embodiments, the cushion 30 may be slidable laterally to enable positioning or adjustment.

Figure 2:
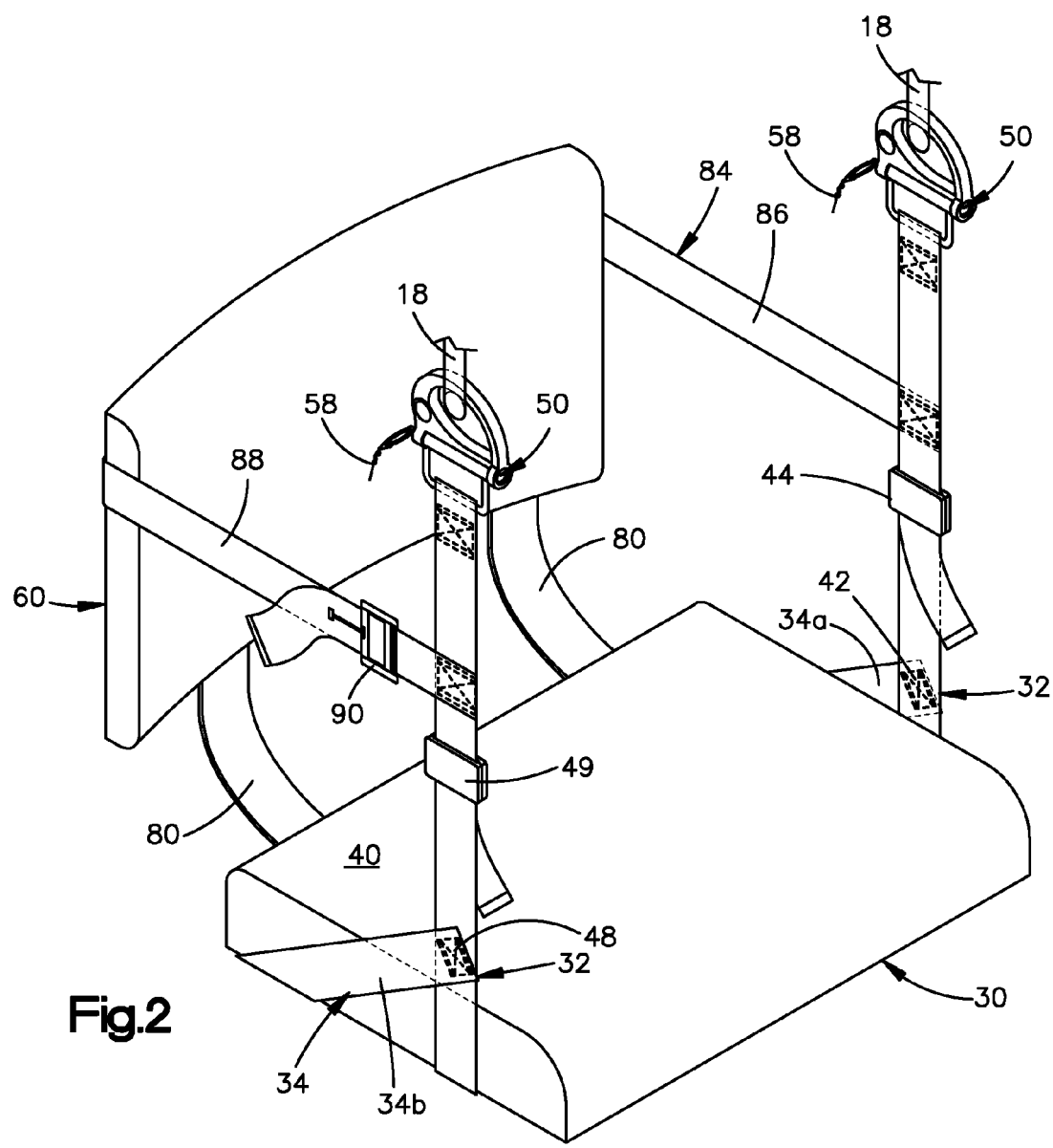
FIG. 2 is an enlarged perspective view of the seat of FIG. 1.
Figure 3:
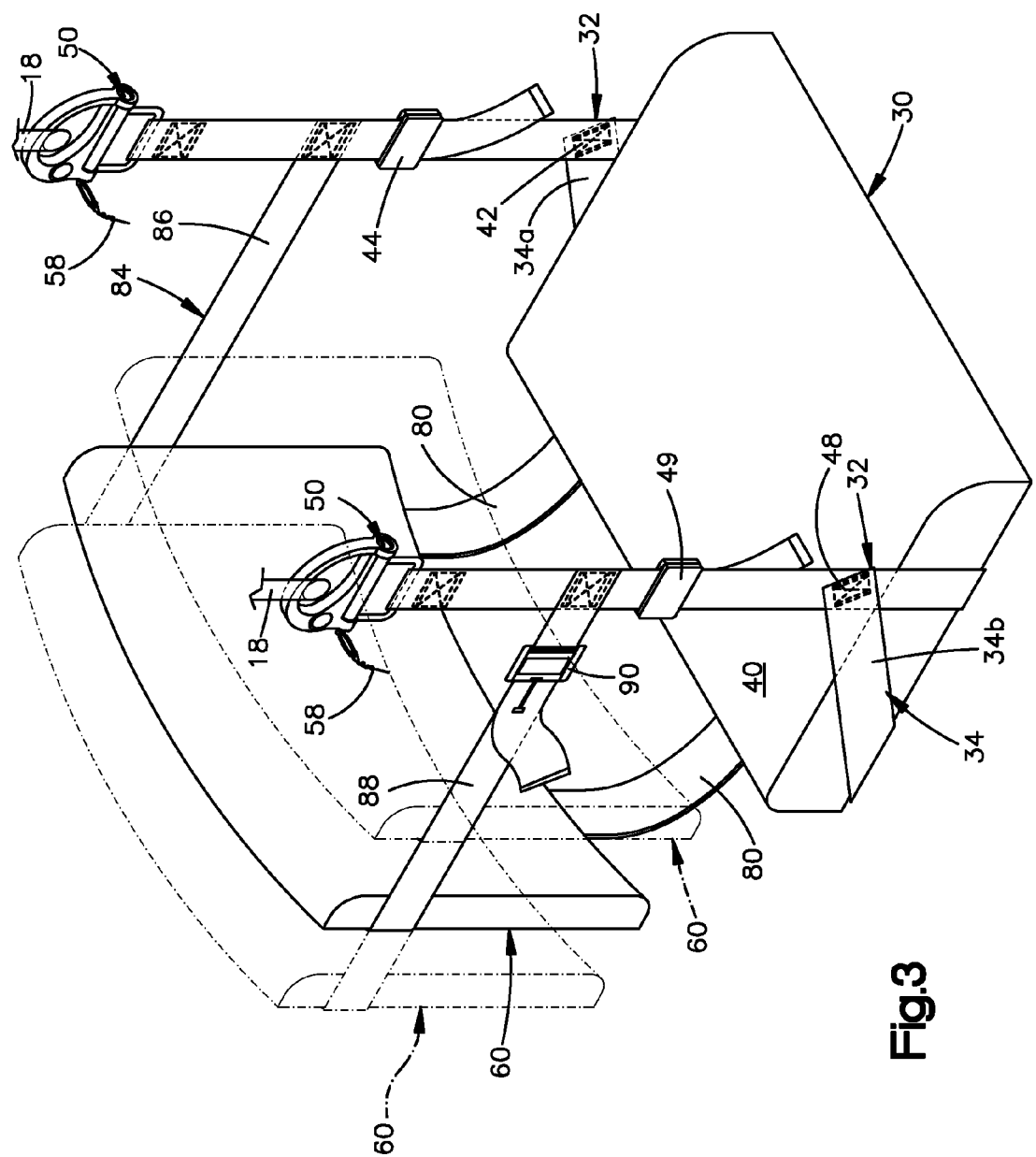
FIG. 3 is a view similar to FIG. 2 showing the adjustability of the seat back relative to the seat bottom cushion.

On the left side 38 of the seat 10, the two straps 32 and 34a join at a sew location 42. The sew location 42 may be on either the inside or the outside of the strap 32. (All the illustrated sew locations in the drawings are merely exemplary and could be varied.) The strap 32 extends upward from the sew location 42 to a length adjuster shown schematically at 44 (FIGS. 2 and 3). The length adjuster is a standard belt/strap adjuster capable of varying the length of the strap 32 on the occupant's left side 38 of the seat 10 and locking at the selected length.

Above the adjuster 44 the strap 32 connects with a snap shackle 50. The shackle 50 is a commercially available part, such as part number S0158-0003 or S0158-0004 available from Pacific Marine, and part number S6FSS-258 and S6FSS-334 available from Safeland Industrial.

The shackle 50 includes a lower loop portion 52 and an upper loop portion 54 that are releasably interconnected by a release pin 56. The upper loop portion 54 of the shackle 50 extends around the support bracket 18 on the overhead structure 14. The shackle 50 thus connects the strap 32 and thereby the seat 10 with the overhead structure 14 of the vehicle 12. The release pin 56 is connected with a lanyard 58. The lanyard 58 hangs freely by the seat 10 and is manually engageable by an occupant of the seat, or by someone else, to release the seat from the overhead structure, as described below.

A similar structure is provided on the opposite right side 40 of the seat 10. The two straps 32 and 34b join at a sew location 48. The strap 32 extends upward from the sew location 48 to and through an adjuster shown schematically at 49. The upper end of the strap extends around a lower portion of a snap shackle 50. The upper portion of the snap shackle 50 is releasably hooked on the support bracket 18 on the overhead structure 14 of the vehicle 12.

With the two adjusters 44 and 49, the distance between the overhead structure 14 and the seat bottom cushion 30 is selectively adjustable. This capability is used, as described below, to adjust the vertical position of the seat 10, to accommodate occupants of different sizes and to adjust the field of view of the occupant.

Figure 6:
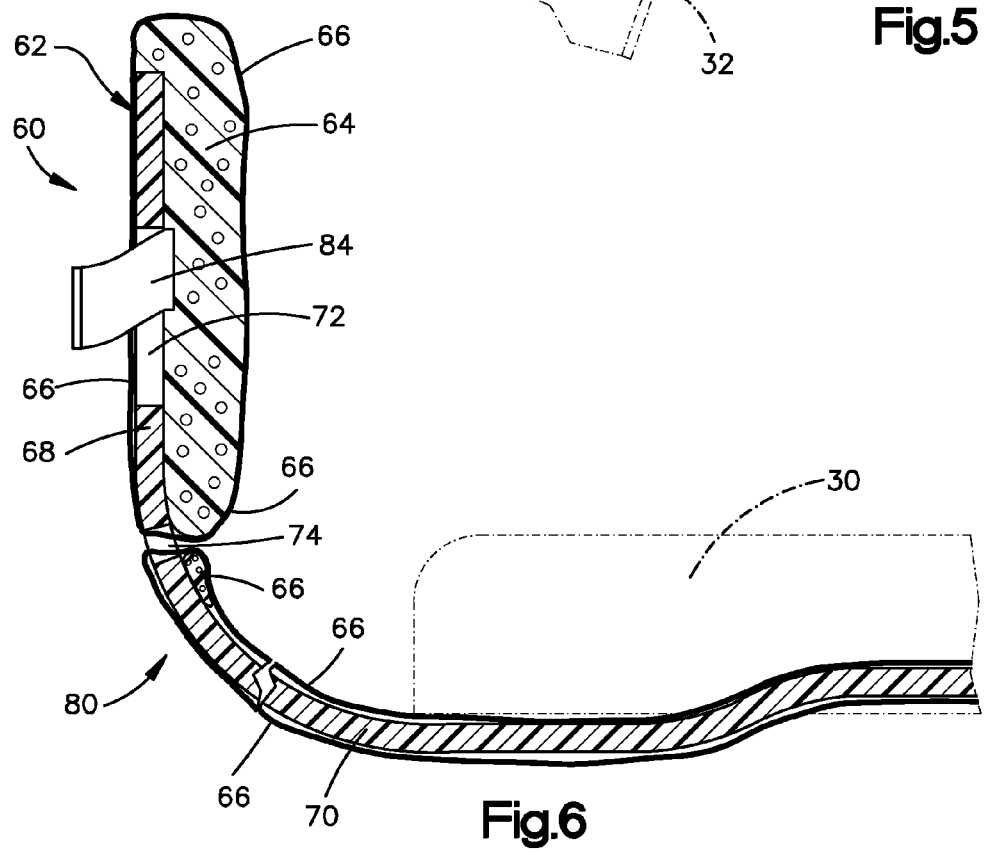
FIG. 6 is a schematic sectional view of a portion of the seat of FIG. 1.

The seat back 60 (FIGS. 4 and 6) includes an insert 62, a cushion shown partially at 64, and a cover shown schematically at 66. The insert 62 is preferably a single piece of stiff but flexible plastic having a generally rectangular main body portion 68 and two arms 70 extending down from the main body portion. Two vertically extending slots 72 are formed in the main body portion 68, above two horizontal slots 74. The horizontal slots 74 are located above the arms 70. The insert 62 is surrounded by the cushion 64 which is in turn covered by the cover 66.

The seat bottom cushion 30 (FIG. 2) is connected with the seat back 60 by two fore and aft extending straps 80. The straps 80 extend rearward and upward from the rear underside of the seat bottom cushion 30 to the lower backside of the seat back 60. The straps 80 are fixed in length. In an alternative embodiment (not shown), the straps 80 may be adjustable in length.

Each one of the straps 80 includes an arm 70 of the insert 62, covered by belt webbing or other covering material 66. The arms 70 of the insert 62 have their distal ends fixed in or otherwise connected to the seat bottom cushion 30. The covering material 66 extends from the distal end of the arm 70, up the front side of the arm, through the horizontal slot 74 in the main body portion 68 of the insert 62, and down the back side of the arm to the distal end of the arm.

The seat back 60 has a strap passage 82 that extends across the width of the seat back, from the left side 38 to the right side 40. A back strap 84 extends through the passage 82 and through the vertical slots 72 in the insert 62. The back strap 84 is slidable through the passage 62. The back strap 84 has two end portions 86 and 88 that project from the left and right sides 38 and 40, respectively, of the seat 10.

On the left side 38 of the seat 10, the back strap 84 is fixed to the strap 32. On the opposite right side 40 of the seat 10, the back strap 84 extends through a length adjuster shown schematically at 90 and then is fixed to the strap 32. The adjuster 90 could, alternatively, be provided on the left side 38 of the seat 10. Further, the back strap 84 could alternatively be fixed to the strap 32 at a different location, for example, up at the connection to the shackle 50.

The length of the back strap 84 is adjustable by means of the adjuster 90. As the back strap 84 is lengthened or shortened, the seat back 60 is moved along the back strap. This adjustment capability is used, as described below, to adjust the fore and aft position of the seat back 60 relative to the seat bottom cushion 30, to accommodate occupants of different sizes and/or wearing additional gear. This movement may also involve some pivoting movement of the seat back 60.

In addition, the seat back 60 is vertically movable along the back strap, 84 because the height of the vertical slots 72 in the seat back is about two to three times as great as the vertical dimension of the back strap. This difference enables vertical adjustment of the seat back 60 relative to the seat bottom cushion 30, as described below.

In use of the seat 10, the left and right side shackles 50 are connected with the support brackets 18 of the vehicle overhead structure 14 to support the seat 10 on the vehicle. The seat 10 is thus suspended from and can swing from the overhead structure 14.

The vertical position of the seat 10 can then be set by setting the length of the strap 32 on both sides of the seat via the adjusters 44 and 49. A vertical position of the seat 10 may be selected that provides the occupant with the ability to see out from the turret opening 20. Alternatively, the vertical position of the seat 10 can be set at a lower position, if the occupant does not need to see out of the turret opening 20. The vertical adjustment capability of the seat 10 enables it to accommodate different size occupants.

The seat back 60 provides back support that is missing from prior art vehicle sling seats. The fore and aft position of the seat back 60 relative to the seat bottom cushion 30 is set by adjusting the length of the back strap 84 with the adjuster 90, as shown in FIG. 3. Lengthening the back strap 84 allows the seat back 60 to move rearward relative to the seat bottom cushion 30. This could help to accommodate a larger occupant, or an occupant who is wearing more personal gear, such as a backpack. Shortening the back strap 84 pulls the seat back 60 closer (forward) relative to the seat bottom cushion 30. This can help to accommodate a smaller occupant, or may be desirable if the occupant of the seat 10 is not wearing personal gear, such as a backpack.

The vertical position of the seat 60 back can be adjusted by pushing up or down, before sitting or when seated by reaching behind. The vertical position of the seat back 60 relative to the seat bottom cushion 30 is set by moving the seat back up or down on the back strap 64, as allowed by the oversize vertical slots 72 in the insert 62. In the illustrated embodiment, detent positions are not provided for this adjustment because, when the occupant is seated, the weight of the occupant holds the seat back 60 in position, even though it is relatively loosely connected with the seat bottom cushion. When the occupant exits the seat 10, friction holds the seat back 60 in its last position on the back strap 84.

The resilient stiffness of the arms 70, which extend between the seat back 60 and the seat bottom cushion 30, provides a self-supporting effect for the seat back relative to the seat bottom cushion, maintaining the seat 10 ready for use at all times and needing only adjustment, rather than needing to pick up the seat back and position it behind the occupant.

The vertical position of the floor portion 26 can be set so that it comes up to the occupant's feet, to help support and balance the occupant. Alternatively, with the several adjustments provided within the seat 10, the occupant can balance well and sit comfortably for long periods of time even if the occupant's feet do not touch the floor portion 26.

The occupant can use the fore and aft seatback adjustment feature, together with the other adjustments of the seat 10 as a whole, to position himself correctly and as desired in the vehicle. The seat 10 is fully adjustable for use by occupants of different sizes, for example including a range from a $5^{th}$ percentile woman to a $95^{th}$ percentile man.

The shackles 50 are emergency release devices that fully release, even when the occupant is seated and thus loading (placing a load on) the seat 10 (vertically downward), to enable emergency evacuation of the seat with no binding. Each shackle 50 is actuated by pulling on its associated lanyard 58, releasing the upper loop portion 54 of the shackle to come free from the support bracket 18. (The two shackles may also be configured to be actuatable simultaneously by pulling on only one lanyard.) The shackle 50 and strap 32 are then free to drop down under the load of the seat 10 and/or occupant. It is not necessary to lift the seat 10 or the occupant. It is not necessary to remove load from the shackles 50. This emergency release capability is a substantial benefit in an emergency situation, and can also reduce the time needed for the occupant to enter or exit the vehicle.

The seat 10 may include apparatus for helping to protect an occupant of the seat in the event of sudden vertical movement of the vehicle 12, as may result from high decelerations caused by rough road maneuvers, or initial acceleration pulse from a mine blast, for example. Such apparatus may be provided in conjunction with the shackles 50, which attach to the strap 32. Such apparatus may be in the form of one or more energy absorbers or load limiters of the type that function by bending or extruding of metal, or by the controlled tearing of structural stitching, for example. Such devices, if provided in the vertical load path of the supporting structure for the seat 10, would help to mitigate such deceleration effects.

The invention claimed is:

1. A sling seat that can be suspended from an overhead, structure of a vehicle, comprising:
    a seat bottom cushion;
    left and right supports extending upward from the seat bottom cushion for connection with the overhead structure to suspend the seat bottom cushion from the overhead structure;
    the length of the left and right supports being adjustable thereby to adjust the vertical position of the seat bottom cushion relative to the overhead structure of the vehicle;
    a seat back connected with the seat bottom cushion, the fore and aft position of the seat back being adjustable relative to the seat bottom cushion, the vertical position of the seat back being adjustable relative to the seat bottom cushion.

2. A sling seat as set forth in claim 1 including length adjusters in the left and right supports for adjusting the length of the left and right supports thereby to adjust the vertical position of the seat bottom cushion relative to the overhead structure of the vehicle;
    a back support strap extending generally horizontally between the left and right supports and the seat back for resisting movement of the seat back away from the seat bottom cushion when the seat is occupied; and
    a length adjuster in the back support strap for adjusting the length of the back support strap thereby to adjust the fore and aft position of the seat back relative to the seat bottom cushion.

3. A sling seat as set forth in claim 2 wherein the seat back is adjustable vertically relative to the back support strap so as to adjust the vertical position of the seat back relative to the seat bottom cushion.

4. A sling seat as set forth in claim 1 including left and right quick release connectors connecting the left and right supports with the overhead structure;
    the connectors having a locked condition for supporting the seat and any load therein in a load-bearing manner from the overhead structure;
    the connectors being actuatable from the locked condition to a released position for releasing the supports from the overhead structure to enable the seat and any load therein to fall downward away from the overhead structure without lifting the seat closer to the overhead structure or reducing the load that is being carried by the seat.

5. A sling seat as set forth in claim 4 wherein the connectors are quick release snap shackles.

6. A sling seat as set forth in claim 4 including left and right release lanyards that are pullable to actuate the left and right connectors, respectively.

7. A sling seat as set forth in claim 1 including resilient arms that support the seat back in a self-supporting position relative to the seat bottom cushion.

8. A seat that that can be suspended from an overhead structure of a vehicle, comprising:
    a seat bottom cushion;
    left and right supports extending upward from the seat bottom cushion for connection with the overhead structure to suspend the seat bottom cushion from the overhead structure;
    a seat back adjustably connected with the seat bottom cushion; and
    left and right quick release connectors connecting the left and right supports with the overhead structure;
    the connectors having a locked condition for supporting the seat and any load therein in a load-bearing manner from the overhead structure;
    the connectors being actuatable from the locked condition to a released position for releasing the supports from the overhead structure to enable the seat and any load therein to fall downward away from the overhead structure without lifting the seat closer to the overhead structure or reducing the load that is being carried by the seat.

9. A seat as set forth in claim 8 wherein the connectors are quick release snap shackles.

10. A seat as set forth in claim 8 including left and right release lanyards that are pullable to actuate the left and right connectors, respectively.

11. A seat as set forth in claim 8 wherein:
    the length of the left and right supports is adjustable thereby to adjust the vertical position of the seat bottom cushion relative to the overhead structure of the vehicle;
    the fore and aft position of the seat back is adjustable relative to the seat bottom cushion; and
    the position of the seat back is adjustable vertically relative to the seat bottom cushion.

12. A sling seat that that can be suspended from an overhead structure of a vehicle, comprising:
    a seat bottom cushion;
    left and right supports extending upward from the seat bottom cushion for connection with the overhead structure to suspend the seat bottom cushion from the overhead structure;
    the left and right supports being adjustable in length to adjust the vertical position of the seat bottom cushion relative to the overhead structure of the vehicle;
    a seat back connected by straps with the seat bottom cushion and being adjustable in its fore and aft position relative to the seat bottom cushion and being adjustable in its vertical position relative to the seat bottom cushion.
    left and right quick release connectors connecting the left and right supports with the overhead structure, the connectors being actuatable to a released condition for releasing the supports from the overhead structure to enable the seat and any load therein to fall downward away from the overhead structure without lifting the seat closer to the overhead structure or reducing the load that is being carried by the seat.

13. A sling seat as set forth in claim 12 wherein the connectors have a locked condition for supporting the seat and any load therein in a load-bearing manner from the overhead structure, the connectors being actuatable from the locked condition to the released condition by pulling on at least one lanyard.

14. A sling seat as set forth in claim 13 wherein the straps that connect the seat back with the seat bottom cushion comprise resilient arms that support the seat back in a self-supporting position relative to the seat bottom cushion.

15. A sling seat as set forth in claim 14 wherein all the other straps in the seat are non-resilient fabric straps.

16. A vehicle comprising a rotatable overhead structure having two support brackets, a sling seat suspended from the support brackets, and a port through which an occupant of the sling seat occupant can see out of the vehicle;

the sling seat comprising a seat bottom cushion;

the sling seat comprising left and right supports extending upward from the seat bottom cushion for connection with the overhead structure, the length of the left and right supports being adjustable thereby to adjust the vertical position of the seat bottom cushion relative to the overhead structure of the vehicle; and the sling seat comprising a seat back connected with the seat bottom cushion, the fore and aft position of the seat back being adjustable relative to the seat bottom cushion, the position of the seat back being adjustable vertically relative to the seat bottom cushion.

* * * * *